(12) United States Patent
Deka et al.

(10) Patent No.: US 11,841,776 B2
(45) Date of Patent: Dec. 12, 2023

(54) SINGLE CHIP MULTI-DIE ARCHITECTURE HAVING SAFETY-COMPLIANT CROSS-MONITORING CAPABILITY

(71) Applicant: Intel Corporation, Santa Clara, CA (US)

(72) Inventors: Nabajit Deka, Bangalore (IN); Riccardo Mariani, Calci (IT); Asad Azam, El Dorado Hills, CA (US); Roger May, Banbury (GB); Prashanth Gadila, Hyderabad (IN)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 16/439,407

(22) Filed: Jun. 12, 2019

(65) Prior Publication Data

US 2019/0294125 A1 Sep. 26, 2019

(51) Int. Cl.
*G06F 11/00* (2006.01)
*G06F 11/16* (2006.01)
(Continued)

(52) U.S. Cl.
CPC ............ *G06F 11/1641* (2013.01); *G05B 9/02* (2013.01); *G06F 11/0796* (2013.01); *G06F 11/3055* (2013.01); *G06F 13/122* (2013.01)

(58) Field of Classification Search
CPC ............ G06F 11/0796; G06F 11/1629; G06F 11/1641; G06F 11/165; G06F 11/1654;
(Continued)

(56) References Cited

U.S. PATENT DOCUMENTS

| 4,228,496 A | * | 10/1980 | Katzman | ............. | G06F 11/2097 |
| | | | | | 714/E11.015 |
| 4,726,024 A | * | 2/1988 | Guziak | ............... | G06F 11/0796 |
| | | | | | 714/24 |

(Continued)

OTHER PUBLICATIONS

Iyer, Ravishankar K., and Zbigniew Kalbarczyk. "Hardware and software error detection." Research paper, Center for Reliable and High-Performance Computing Coordinated Science Laboratory, University of Illinois at Urbana-Champaign, Urbana (2003). (Year: 2003).*

(Continued)

*Primary Examiner* — Anthony J Amoroso
(74) *Attorney, Agent, or Firm* — Schwegman Lundberg & Woessner, P.A.

(57) ABSTRACT

Methods, systems and apparatuses may provide for technology that includes a chip having a first die including a first processing logic to execute a first application instance and generate a first output of the first application instance, and a second processing logic to execute a second application instance and generate a second output of the second application instance. The chip may also include a second die coupled to the first die, wherein the second die includes a safety monitor detect a condition associated with one or more of an error in the first output, an error in the second output, or a discrepancy between the first output and the second output. The safety monitor may also initiate a transition of the chip into a safe state in response to the condition.

21 Claims, 3 Drawing Sheets

(51) Int. Cl.
  *G05B 9/02* (2006.01)
  *G06F 11/30* (2006.01)
  *G06F 13/12* (2006.01)
  *G06F 11/07* (2006.01)

(58) Field of Classification Search
  CPC .... G06F 11/3055; G06F 13/12; G06F 13/122; G05B 9/02
  See application file for complete search history.

(56) References Cited

U.S. PATENT DOCUMENTS

| | | | | |
|---|---|---|---|---|
| 7,055,060 | B2* | 5/2006 | Nguyen | G06F 11/1641 714/724 |
| 7,647,476 | B2* | 1/2010 | Mozak | G06F 15/7832 710/305 |
| 9,189,439 | B2* | 11/2015 | Rachakonda | G06F 13/40 |
| 9,460,038 | B2* | 10/2016 | Gaskins | G06F 13/14 |
| 10,528,414 | B2* | 1/2020 | Tomlin | G06F 11/0787 |
| 2013/0231767 | A1* | 9/2013 | Sabapathy | G06F 11/0796 700/95 |
| 2017/0078455 | A1* | 3/2017 | Fisher | H04L 69/326 |

OTHER PUBLICATIONS

Hayek, Ali, Michael Schreiber, Bashier Machmur, and Josef Boercsoek. "Design and implementation of on-chip safety controller in terms of the standard IEC 61508." In Proceedings of the Conference on Recent Advances in Circuits; Systems and Automatic Control. 2013. (Year: 2013).*

International Organization for Standardization, ISO 13849-1: Safety of Machinery-Safety Related Parts of—Control Systems, Nov. 11, 2006, 11 pages, Second Edition, Geneva, Switzerland.

Banginwar et al., Enhancing Diagnostic Capabilities of Computing Systems by Combining Variable Patrolling API and Comparison Mechanism of Variables, U.S. Appl. No. 16/370,461, filed Mar. 29, 2019.

* cited by examiner

SINGLE CHIP MULTI-DIE ARCHITECTURE HAVING SAFETY-COMPLIANT CROSS-MONITORING CAPABILITY

TECHNICAL FIELD

Embodiments generally relate to functional safety applications. More particularly, embodiments relate to a single chip, multi-die architecture having safety-compliant cross monitoring capability.

BACKGROUND

Compliance with functional safety requirements (e.g., Category 3/Cat3, Performance Level d/Pld of the ISO-13849 standard) is an area of concern in machinery and industrial platforms (e.g., electrical, hydraulic, pneumatic and/or mechanical systems) due to the potential risk that the platforms may present to end users. To address functional safety, platforms may include two separate (e.g., redundant) processing channels, with each processing channel residing on an independent device (e.g., system on chip/SoC). System integration of such an architecture with a cross-monitoring solution, however, may be challenging for several reasons. For example, customizing the hardware and software of the cross-monitoring solution may be costly due to development and certification complexity, as well as a relatively high component count (e.g., bill of materials/BOM). Moreover, if the provider of the processing channel devices is different from the system integrator (e.g., the provider of a third device to perform cross-monitoring), a lack of information about the processing channel capabilities may result in a suboptimal customization of the cross-monitoring device.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
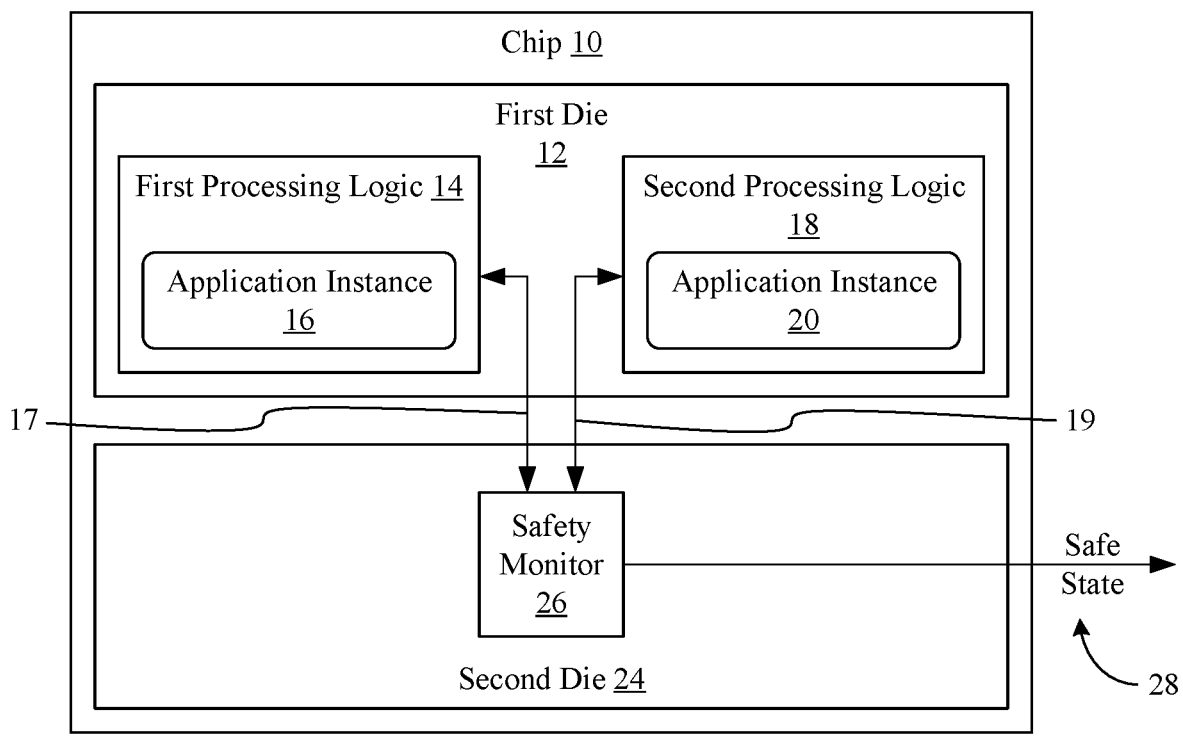
FIG. 1 is a block diagram of an example of a chip according to an embodiment.

FIG. 1 shows a chip 10 (e.g., SoC, semiconductor package including logic coupled to one or more substrates) that may be used to support the safe operation of an industrial platform (e.g., machinery including electrical, hydraulic, pneumatic and/or mechanical subsystems). In the illustrated example, the chip 10 includes a first die 12 having first processing logic 14 (e.g., processor core, execution unit, graphics processing unit/GPU, etc., with one or more caches) to execute a first application instance 16 (e.g., instance of a safety application) and second (e.g., redundant) processing logic 18 to execute a second application instance 20. In general, a safety application may communicate with sensors (e.g., temperature, pressure, speed, chemical and/or optical sensors, not shown) and drive actuators (e.g., solenoids, relays, valves, motors, etc., not shown) on the platform.

In an embodiment, a safety application outputs a set of variables (e.g., "safety variables") that effectively capture the state of the platform. Thus, the safety variables may repeatedly change during execution of the safety application. Accordingly, the illustrated first die 12 generates a first output 17 (e.g., signature) of the first application instance 16 and a second output 19 (e.g., signature) of the second application instance 20. As will be discussed in greater detail, by executing the two independent instances 16, 20 of the safety application on the processing logic 14, 18, respectively, a safety monitor 26 is able to compare the two sets of safety variables and provide enhanced diagnostic coverage to the platform.

The illustrated chip 10 also includes a second die 24 communicatively coupled to the first die 12. In an embodiment, the second die 24 includes a safety monitor 26 (e.g., "safety island") to detect a condition associated with an error/failure (e.g., hardware and/or software error) in a first output of the first application instance 16, an error in a second output of the second application instance 20 and/or a discrepancy between the first output and the second output. Hardware die errors that may trigger the condition include, for example, uncorrectable (e.g., "catastrophic") and correctable errors reported via pins, cross comparison data, and so forth. Software die errors that may trigger the condition include, for example, software test results, clock, voltage and temperature parameters, safe state commands from host software, and so forth.

In an embodiment, the safety monitor 26 initiates a transition of the chip 10 and/or the platform into a safe state in response to the condition. For example, the safety monitor 26 may generate a safe state signal 28 on one or more error pins to initiate the transition. The safety monitor 26 may also generate the safe state signal 28 in response to errors detected on the second die 24 such as, for example, hardware errors reported via error pins, software test results, clock and temperature parameters, and so forth. The illustrated chip 10 therefore reduces a number of challenges associated with system integration. For example, development and certification complexity is reduced because the safety monitor 26 is integrated with the processing logic 14, 18 onto the same semiconductor package. Additionally, costs are reduced due to a decrease in component count (e.g., BOM). Moreover, because the provider/manufacturer of the first die 12 is the same as the provider/manufacturer of the second die 24, the system integrator (e.g., platform developer) no longer requires detailed information about the capabilities of the first die 12 to achieve a more optimal customization of the safety monitor 26.

Figure 2:
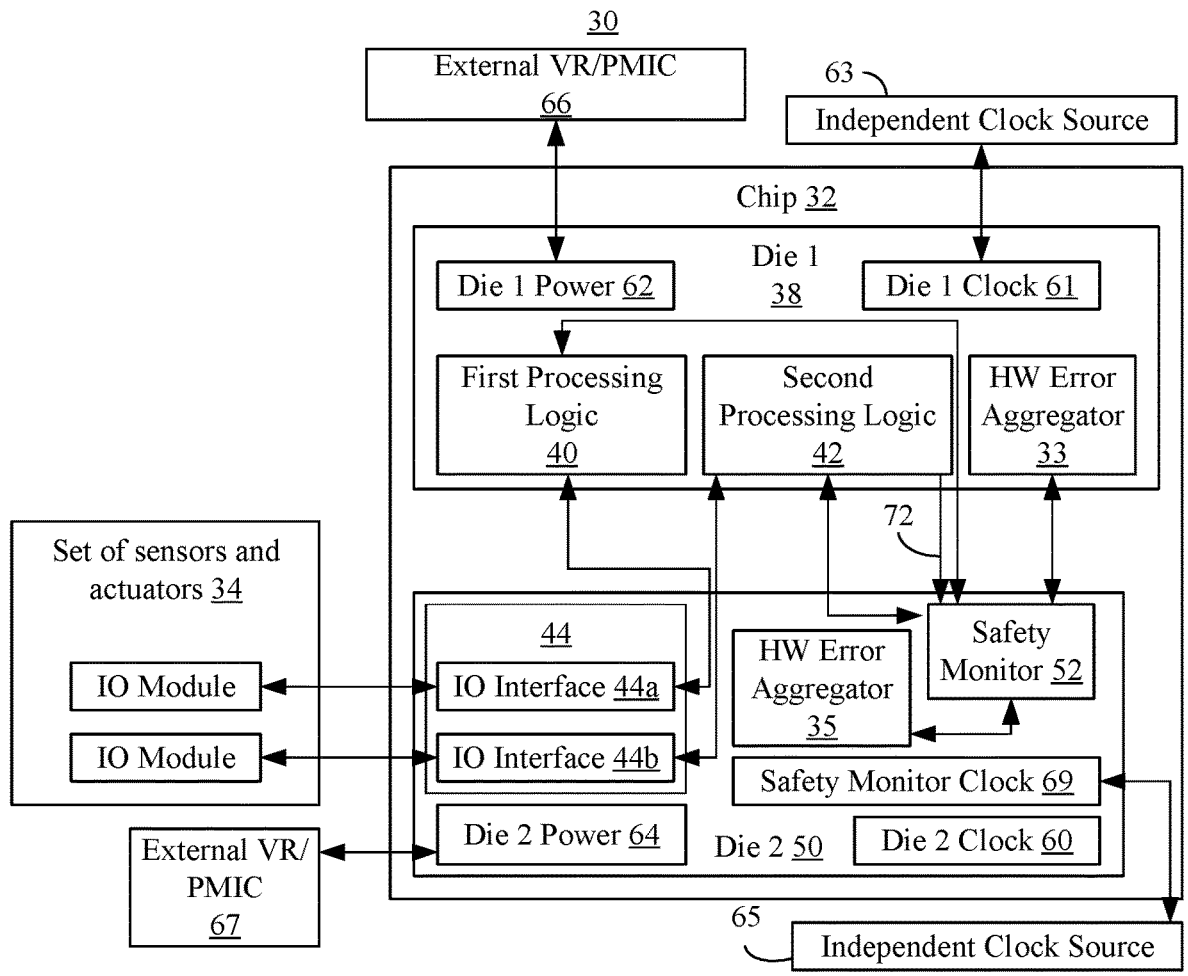
FIG. 2 is a block diagram of an example of a platform according to an embodiment.

FIG. 2 shows a platform 30 having enhanced diagnostic coverage and safety monitoring capabilities. The platform 30 may generally be an industrial and/or automotive system with functional safety requirements (e.g., ISO-13849). In the illustrated example, a chip 32 is coupled to a set 34 of sensors (e.g., temperature, pressure, speed, chemical and/or optical sensors) and actuators (e.g., solenoids, relays, valves, motors, etc.) and a having multiple input/output (IO) modules. In the illustrated example, the chip 32 includes a first die 38 ("Die 1", e.g., host processor, central processing unit/CPU) having first processing logic 40 (e.g., first processing channel) to execute a first application instance (e.g., instance of a safety application, not shown) based on communications with the set 34 of sensors and actuators. In an embodiment, the chip 32 also includes and second processing logic 42 (e.g., second processing channel) to execute a second application instance (not shown) based on communications with the set 34 of sensors and actuators.

A first interface component 44a of an IO interface 44 (44a, 44b) may be coupled to the first processing logic 40 and an IO module in the set 34 of sensors and actuators, wherein the first interface component 44a communicates in accordance with an end-to-end protection protocol (e.g., software-based "black channel" protocol). Similarly, a second interface component 44b of the IO interface 44 is coupled to the second processing logic 42 and another IO module in the set 34 of sensors and actuators, wherein the second interface component 44b communicates in accordance with an end-to-end protection protocol. Thus, the illustrated IO interface 44 enhances resistance to single points of failure and/or common cause failures (CCFs).

As already noted, the first processing logic 40 generates a first output of the first application instance and the second processing logic 42 generates a second output of the second application instance. In an embodiment, a second die 50 ("Die 2") is coupled to the first die 38, wherein the second die 50 includes a safety monitor 52 to detect a condition associated with an error (e.g., hardware and/or software error) in the first output of the first application instance, an error in the second output of the second application instance, a discrepancy between the first output and the second output, etc., or any combination thereof. The condition may also be associated with an error detected by a hardware error aggregator 33 on the first die 38 and/or a hardware error aggregator 35 on the second die 50. In an embodiment, the safety monitor 52 initiates a transition of the chip 32 and/or the platform 30 into a safe state in response to the condition. In one example, the first die 38 further includes a first clock 61 driven by an independent clock source 63. Additionally, the second die 50 may also include a second clock 60 driven by an independent clock source 65 and a safety monitor clock 69. In an embodiment, the first clock 61, the second clock 60, and the safety monitor clock 69 are independent from one another, which further increases resistance to single points of failure and/or CCFs.

In the illustrated example, the first die 38 further includes a first power source 62 (e.g., host power) coupled to a first external source 66 (e.g., voltage regulator/and/or power management integrated circuit/PMIC) and the second die 50 includes a second power source 64 (e.g., IO power) coupled to a second external source 67, wherein the first and second power sources 62, 64 are independent from one another. Again, the independence of the power sources 62, 64 may increase resistance to single points of failure and/or CCFs. In the illustrated example, processing logic such as, for example, the second processing logic 42 monitors a heartbeat signal 72 from the safety monitor 52 as an additional layer of safety protection.

The illustrated chip 32 therefore reduces a number of challenges associated with system integration. For example, development and certification complexity is reduced because the safety monitor 52 is integrated with the processing logic 40, 42 onto the same semiconductor package. Additionally, costs are reduced due to a decrease in component count (e.g., BOM). Moreover, because the provider/manufacturer of the first die 38 is the same as provider/manufacturer of the second die 50, the developer of the platform 30 (e.g., system integrator) no longer requires detailed information about the capabilities of the host die 38 to achieve a more optimal customization of the safety monitor 52.

Although the platform 30 is described as an industrial and/or automotive (e.g., car, truck, motorcycle) system, the platform 30 may be used for other purposes. For example, the platform 30 might be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), robotic functionality (e.g., autonomous robot and/or drone), medical functionality, aerospace functionality, etc., or any combination thereof.

Figure 3:
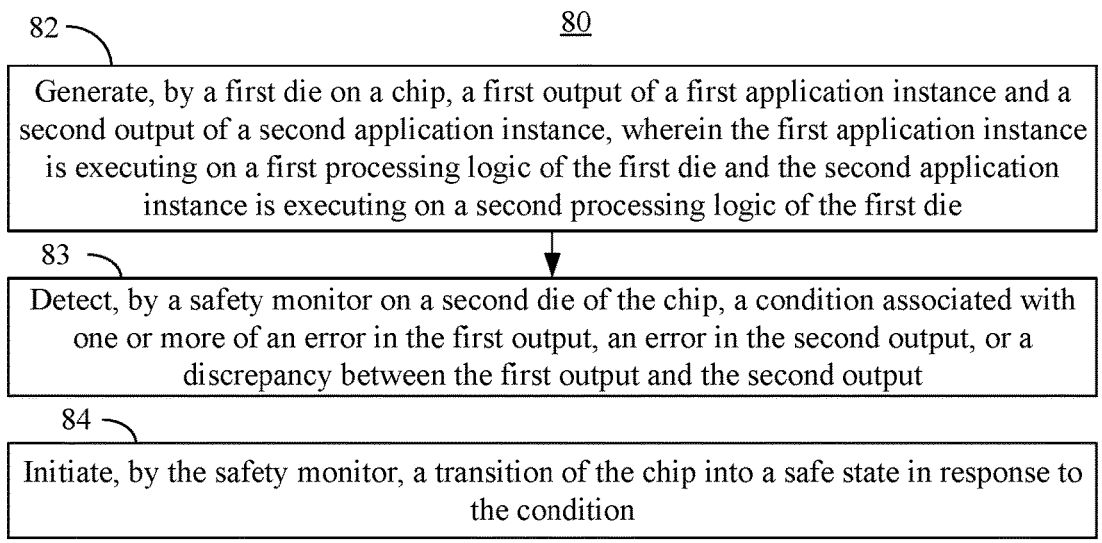
FIG. 3 is a flowchart of an example of a method of operating a chip according to an embodiment.

FIG. 3 shows a method 80 of operating a chip. The method 80 may generally be implemented in a chip such as, for example, the chip 10 (FIG. 1) and/or the chip 32 (FIG. 2), already discussed. More particularly, the method 80 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 80 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 82 generates, by a first die on the chip, a first output of a first application instance and a second output of a second application instance, wherein the first application instance is executing on first processing logic of the first die and the second application instance is executing on second processing logic of the first die. Block 83 detects, by a safety monitor on a second die of the chip, a condition associated with one or more of an error in the first output, an error in the second output, or a discrepancy between the first output and the second output. The errors in the first output and/or the second output may include hardware errors, software errors, etc., or any combination thereof.

Additionally, block 84 provides for initiating, by the safety monitor, a transition of the chip into a safe state in response to the condition. The method 80 therefore reduces a number of challenges associated with system integration. For example, development and certification complexity is reduced because the safety monitor is integrated with the processing logic onto the same semiconductor package. Additionally, costs are reduced due to a decrease in component count (e.g., BOM). Moreover, because the provider/ manufacturer of the first die is the same as provider/manufacturer of the second die, the system integrator (e.g., platform developer) no longer requires detailed information about the capabilities of the first die to achieve a more optimal customization of the safety monitor (e.g., fully leveraging processing channel capabilities).

The method 80 may also include operating the first die with a first clock source and operating the safety monitor with a second clock source, wherein the first clock source and the second clock source are independent from one another. Additionally, the first die may be powered with a first power source and the second die may be powered with a second power source, wherein the first power source and the second power source are independent from one another. In an embodiment, the method 80 further provides for communicating via a first IO interface coupled to the first processing logic and communicating via a second IO interface coupled to the second processing logic. Moreover, communications via the first IO interface and the second IO interface may be in accordance with an end-to-end protection protocol. In one example, the method 80 includes monitoring, by the safety monitor, a heartbeat signal from either the first processing logic or the second processing logic. Such an approach effectively ensures that the safety monitor is operational.

Figure 4:
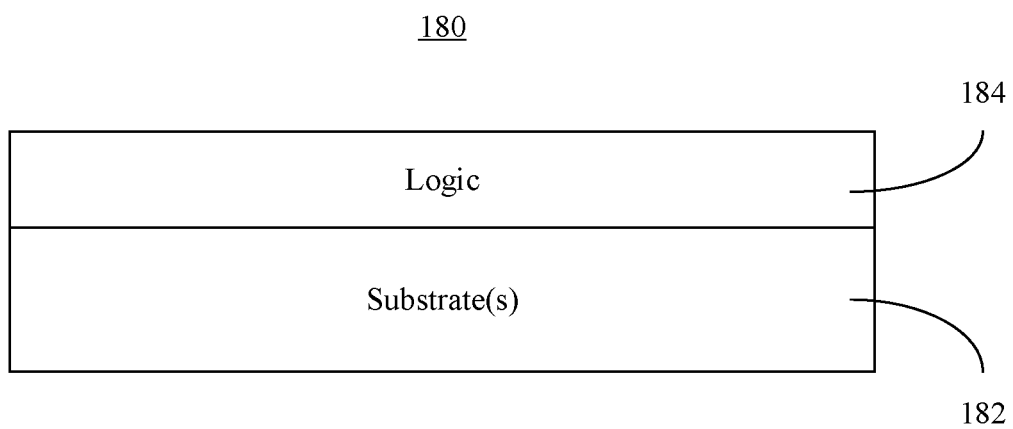
FIG. 4 is an illustration of an example of a semiconductor package apparatus according to an embodiment.

FIG. 4 shows a semiconductor apparatus 180 (e.g., chip, SoC). The illustrated apparatus 180 includes one or more substrates 182 (e.g., silicon, sapphire, gallium arsenide) and logic 184 (e.g., transistor array and other integrated circuit/IC components) coupled to the substrate(s) 182. In an embodiment, the apparatus 180 includes the chip 10 (FIG. 1) and/or the chip 32 (FIG. 2) and the logic 184 implements one or more aspects of the method 80 (FIG. 3), already discussed. Thus, the logic 184 may generate, by a first die on the chip, a first output of a first application instance and a second output of a second application instance, wherein the first application instance is executing on first processing logic of the first die and the second application instance is executing on second processing logic of the first die. In an embodiment, the logic 184 also detects a condition associated with one or more of an error in a first output of a first application instance, an error in a second output of a second application instance, or a discrepancy between the first output and the second output. The errors in the first output and/or the second output may include hardware errors, software errors, etc., or any combination thereof. Additionally, the logic 184 may initiate, by a safety monitor on a second die on the chip, a transition of the chip into a safe state in response to the condition.

The apparatus 180 is therefore a single chip that reduces a number of challenges associated with system integration. For example, development and certification complexity is reduced because the safety monitor is integrated with the processing logics onto the same semiconductor package. Additionally, costs are reduced due to a decrease in component count (e.g., BOM). Moreover, because the provider/manufacturer of the first die is the same as provider/manufacturer of the second die, the system integrator (e.g., platform developer) no longer requires detailed information about the capabilities of the first die to achieve a more optimal customization of the safety monitor (e.g., fully leveraging processing channel capabilities).

The logic 184 may be implemented at least partly in configurable logic or fixed-functionality hardware logic. In one example, the logic 184 includes transistor channel regions that are positioned (e.g., embedded) within the substrate(s) 182. Thus, the interface between the logic 184 and the substrate(s) 182 may not be an abrupt junction. The logic 184 may also be considered to include an epitaxial layer that is grown on an initial wafer of the substrate(s) 182.

Additional Notes and Examples

Example 1 includes a chip comprising a first die including a first power source, a first core to execute a first application instance and generate a first output of the first application instance, and a second core to execute a second application instance and generate a second output of the second application instance, wherein one or more of the error in the first output or the error in the second output is to include one or more of a hardware error or a software error, and a second die coupled to the first die, the second die including a second power source, a safety monitor to detect a condition associated with one or more of an error in the first output, an error in the second output, or a discrepancy between the first output and the second output and initiate a transition of the chip into a safe state in response to the condition, a first clock source coupled to the first die and a second clock source coupled to the safety monitor, wherein the first clock source and the second clock source are independent from one another, and wherein the first power source and the second power source are independent from one another.

Example 2 includes the platform of Example 1, wherein the second die further includes a first input/output (IO) interface coupled to the first core, and a second IO interface coupled to the second core.

Example 3 includes the platform of Example 2, wherein the first IO interface and the second IO interface are to communicate in accordance with an end-to-end protection protocol.

Example 4 includes the platform of any one of Examples 1 to 3, wherein the first processing logic is to monitor a heartbeat signal from the safety monitor.

Example 5 includes a platform comprising a set of sensors and actuators, and a chip coupled to the set of sensors and actuators, the chip including a first die including a first processing logic to execute a first application instance based on communications with the set of sensors and actuators and generate a first output of the first application instance, and a second processing logic to execute a second application instance based on communications with the set of sensors and actuators and generate a second output of the second application instance, and a second die coupled to the first die, the second die including a safety monitor to detect a condition associated with one or more of an error in the first output, an error in the second output, or a discrepancy between the first output and the second output and initiate a transition of the chip into a safe state in response to the condition.

Example 6 includes the platform of Example 5, wherein the second die further includes a first clock source coupled to the first die and a second clock source coupled to the safety monitor, and wherein the first clock source and the second clock source are independent from one another.

Example 7 includes the platform of Example 5, wherein the first die further includes a first power source, the second die includes a second power source, and the first power source and the second power source are independent from one another.

Example 8 includes the platform of Example 5, wherein the second die further includes a first input/output (IO) interface coupled to the first processing logic, the first set of sensors and actuators, and a second IO interface coupled to the second processing logic, the second set of sensors and actuators.

Example 9 includes the platform of Example 8, wherein the first IO interface and the second IO interface are to communicate in accordance with an end-to-end protection protocol.

Example 10 includes the platform of one of Examples 5 to 9, wherein the first processing logic is to monitor a heartbeat signal from the safety monitor.

Example 11 includes the platform of one of Examples 5 to 9, wherein one or more of the error in the first output or the error in the second output is to include one or more of a hardware error or a software error.

Example 12 includes a chip comprising a first die including a first processing logic to execute a first application instance and generate a first output of the first application instance, and a second processing logic to execute a second application instance and generate a second output of the second application instance, and a second die coupled to the first die, the second die including a safety monitor to detect a condition associated with one or more of an error in the first output, an error in the second output, or a discrepancy between the first output and the second output and initiate a transition of the chip into a safe state in response to the condition.

Example 13 includes the chip of Example 12, wherein the second die further includes a first clock source coupled to the first die and a second clock source coupled to the safety monitor, and wherein the first clock source and the second clock source are independent from one another.

Example 14 includes the chip of Example 12, wherein the first die further includes a first power source, the second die includes a second power source, and the first power source and the second power source are independent from one another.

Example 15 includes the chip of Example 12, wherein the second die further includes a first input/output (IO) interface coupled to the first processing logic, and a second IO interface coupled to the second processing logic.

Example 16 includes the chip of Example 15, wherein the first IO interface and the second IO interface are to communicate in accordance with an end-to-end protection protocol.

Example 17 includes the chip of one of Examples 12 to 16, wherein the first processing logic is to monitor a heartbeat signal from the safety monitor.

Example 18 includes the chip of one of Examples 12 to 16, wherein one or more of the error in the first output or the error in the second output is to include one or more of a hardware error or a software error.

Example 19 includes a method of operating a chip, comprising generating, by a first die on the chip, a first output of a first application instance and a second output of a second application instance, wherein the first application instance is executing on a first processing logic of the first die and the second application instance is executing on a second processing logic of the first die, detecting, by a safety monitor on a second die on the chip, a condition associated with one or more of an error in the first output, an error in the second output, or a discrepancy between the first output and the second output, and initiating, by the safety monitor, a transition of the chip into a safe state in response to the condition.

Example 20 includes the method of Example 19, further including operating the first die with a first clock source and operating the safety monitor with a second clock source, wherein the first clock source and the second clock source are independent from one another.

Example 21 includes the method of Example 19, further including powering the first die with a first power source and powering the second die with a second power source, wherein the first power source and the second power source are independent from one another.

Example 22 includes the method of Example 19, further including communicating via a first input/output (IO) interface coupled to the first processing logic and communicating via a second IO interface coupled to the second processing logic.

Example 23 includes the method of Example 22, wherein communications via the first IO interface and the second IO interface are in accordance with an end-to-end protection protocol.

Example 24 includes the method of one of Examples 19 to 23, further including monitoring, by the safety monitor, a heartbeat signal from the first processing logic.

Example 25 includes the method of one of Examples 19 to 23, wherein one or more of the error in the first output or the error in the second output includes one or more of a hardware error or a software error.

Technology described herein may therefore provide a "plug-in" single chip solution with integrated cross monitoring of hardware, firmware (FW) and software that reduces the effort on system integrators to meet safety standards and reduce BOM costs of the platform.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A chip comprising:
a first die including a first power source; a first hardware error aggregator; a first core to execute a first application instance and generate a first output of the first application instance; and a second core to execute a second application instance and generate a second output of the second application instance, wherein one or more of an error in the first output or an error in the second output is to include one or more of a hardware error or a software error; and
a second die coupled to the first die, the second die including a second power source; a second hardware error aggregator; a safety monitor associated with the first hardware error aggregator and the second hardware error aggregator to detect a condition associated with one or more of an error in the first output, an error in the second output, or a discrepancy between the first output and the second output and initiate a transition of the chip into a safe state in response to the condition, wherein detection of the condition by the safety monitor of the second die is based on aggregated errors from the second hardware error aggregator of the second die and based on aggregated errors from the first hardware error aggregator of the first die; a first clock source coupled to the first die; a second clock source coupled to the safety monitor, wherein the first clock source the second clock source are independent from one another, and wherein the first power source and the second power source are independent from one another,
wherein the second die further includes: a first input/output (IO) interface dedicated to the first core, and a second IO interface dedicated to the second core.

2. The chip of claim 1, wherein the second die further includes:
the first input/output (IO) interface coupled to a first set of sensors and actuators, and
the second IO interface coupled to a second set of sensors and actuators.

3. The chip of claim 2, wherein the first IO interface and the second IO interface are to communicate in accordance with an end-to-end protection protocol.

4. The chip of claim 1, wherein the first core is to monitor a heartbeat signal from the safety monitor.

5. A platform comprising:
a set of sensors and actuators; and
a chip coupled to the set of sensors and actuators, the chip including:
a first die including a first hardware error aggregator, a first processing logic to execute a first application instance based on communications with the set of sensors and actuators and generate a first output of the first application instance, a second processing logic to execute a second application instance based on communications with the set of sensors and actuators and generate a second output of the second application instance, and a first clock coupled to a first independent clock source, and
a second die coupled to the first die, the second die including a second hardware error aggregator; a safety monitor associated with the first hardware error aggregator and the second hardware error aggregator to detect a condition associated with one or more of an error in the first output, an error in the second output, or a discrepancy between the first output and the second output and initiate a transition of the chip into a safe state in response to the condition, wherein detection of the condition by the safety monitor of the second die is based on aggregated errors from the second hardware error aggregator of the second die and based on aggregated errors from the first hardware error aggregator of the first die,
wherein the second die further includes a second clock and a safety monitor clock, wherein the safety monitor clock is coupled to a second independent clock source, wherein the first clock, the second clock, and the safety monitor clock are independent from one another,
wherein the second die further includes: a first input/output (IO) interface dedicated to the first processing logic, and a second IO interface dedicated to the second processing logic.

6. The platform of claim 5, wherein the first die further includes a first power source, the second die includes a second power source, and the first power source and the second power source are independent from one another.

7. The platform of claim 5, wherein the second die further includes:
the first input/output (IO) interface coupled to a first set of sensors and actuators, and
the second IO interface coupled to a second set of sensors and actuators.

8. The platform of claim 7, wherein the first IO interface and the second IO interface are to communicate in accordance with an end-to-end protection protocol.

9. The platform of claim 5, wherein the first processing logic is to monitor a heartbeat signal from the safety monitor.

10. The platform of claim 5, wherein one or more of the error in the first output or the error in the second output is to include one or more of a hardware error or a software error.

11. A chip comprising:
a first die including a first hardware error aggregator, a first processing logic to execute a first application instance and generate a first output of the first application instance, a second processing logic to execute a second application instance and generate a second output of the second application instance, and a first clock coupled to a first independent clock source; and a second die coupled to the first die, the second die including a second hardware error aggregator; a safety monitor associated with the first hardware error aggregator and the second hardware error aggregator to detect a condition associated with one or more of an error in the first output, an error in the second output, or a discrepancy between the first output and the second output and initiate a transition of the chip into a safe state in response to the condition, wherein detection of the condition by the safety monitor of the second die is based on aggregated errors from the second hardware error aggregator of the second die and based on aggregated errors from the first hardware error aggregator of the first die, wherein the second die further includes a second clock and a safety monitor clock, wherein the safety monitor clock is coupled to a second independent clock source, wherein the first clock, the second clock, and the safety monitor clock are independent from one another, wherein the second die further includes: a first input/output (IO) interface dedicated to the first processing logic, and a second IO interface dedicated to the second processing logic.

12. The chip of claim 11, wherein the first die further includes a first power source, the second die includes a second power source, and the first power source and the second power source are independent from one another.

13. The chip of claim 11, wherein the second die further includes:

the first input/output (IO) interface coupled to a first set of sensors and actuators, and the second IO interface coupled to a second set of sensors and actuators.

14. The chip of claim 13, wherein the first IO interface and the second IO interface are to communicate in accordance with an end-to-end protection protocol.

15. The chip of claim 11, wherein the first processing logic is to monitor a heartbeat signal from the safety monitor.

16. The chip of claim 11, wherein one or more of the error in the first output or the error in the second output is to include one or more of a hardware error or a software error.

17. A method of operating a chip, comprising:

generating, by a first die on the chip, a first output of a first application instance and a second output of a second application instance, wherein the first application instance is executing on a first processing logic of the first die and the second application instance is executing on a second processing logic of the first die;

operating a first clock of the first die coupled to a first independent clock source;

aggregating errors via a first hardware error aggregator of the first die;

aggregating errors via a second hardware error aggregator of the second die;

detecting, by a safety monitor on a second die on the chip, a condition associated with one or more of an error in the first output, an error in the second output, or a discrepancy between the first output and the second output, wherein detection of the condition by the safety monitor of the second die is based on based on aggregated errors from the second hardware error aggregator of the second die and based on aggregated errors from the first hardware error aggregator of the first die, wherein the second die includes a second clock and a safety monitor clock;

operating the safety monitor clock coupled with a second independent clock source, and wherein the first clock, the second clock, and the safety monitor clock are independent from one another;

initiating, by the safety monitor, a transition of the chip into a safe state in response to the condition;

communicating via a first input/output (IO) interface on the second die dedicated to the first processing logic; and communicating via a second IO interface on the second die dedicated to the second processing logic.

18. The method of claim 17, further including:

powering the first die with a first power source; and powering the second die with a second power source, wherein the first power source and the second power source are independent from one another.

19. The method of claim 17, wherein communications via the first IO interface and the second IO interface are in accordance with an end-to-end protection protocol.

20. The method of claim 17, further including monitoring, by the first processing logic, a heartbeat signal from the safety monitor.

21. The method of claim 17, wherein one or more of the error in the first output or the error in the second output includes one or more of a hardware error or a software error.

* * * * *